March 8, 1960 W. ZOLLINGER 2,927,503
PHOTOGRAPHIC PROJECTION COPYING DEVICE
Filed April 6, 1955 9 Sheets-Sheet 1
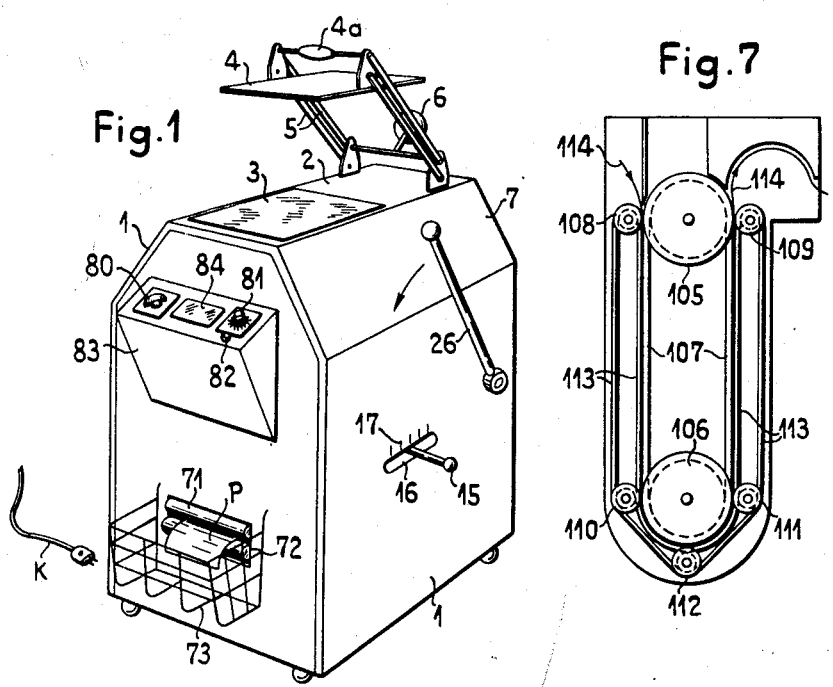
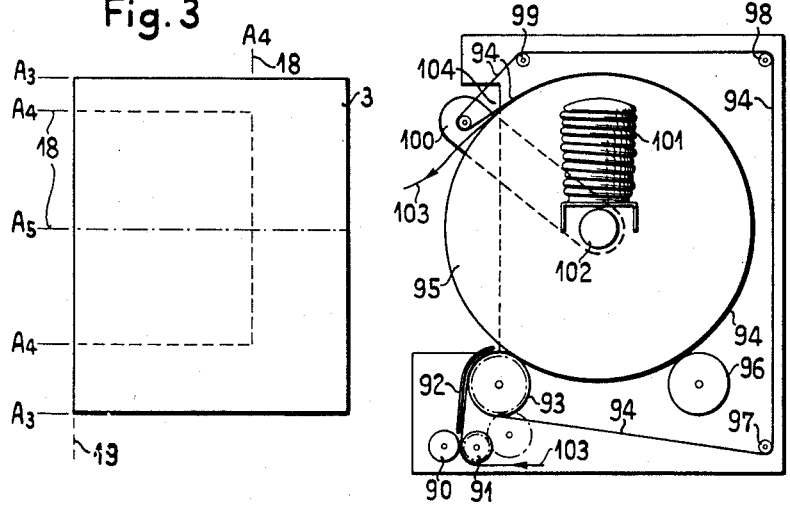
INVENTOR
WALTER ZOLLINGER
BY Young, Emery & Thompson
ATTYS March 8, 1960 — W. ZOLLINGER — 2,927,503
PHOTOGRAPHIC PROJECTION COPYING DEVICE
Filed April 6, 1955 — 9 Sheets-Sheet 2

INVENTOR
WALTER ZOLLINGER
By Young, Emery & Thompson
ATTYS.

March 8, 1960 W. ZOLLINGER 2,927,503
PHOTOGRAPHIC PROJECTION COPYING DEVICE
Filed April 6, 1955 9 Sheets-Sheet 3
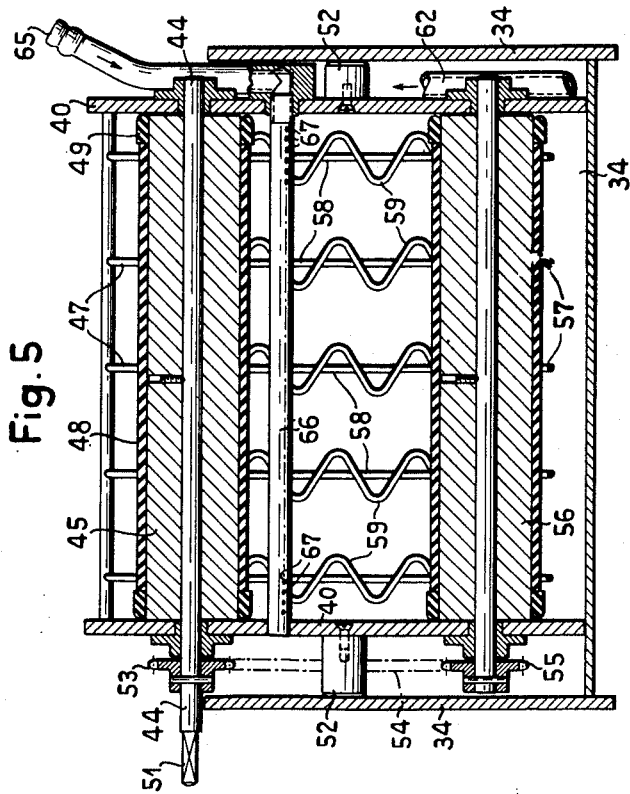
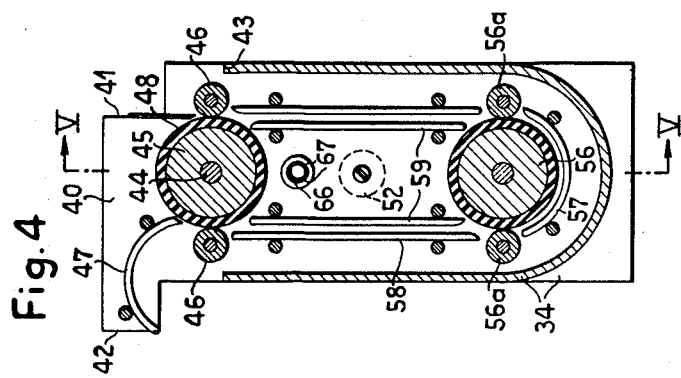
INVENTOR
WALTER ZOLLINGER
BY Young, Emery & Thompson
ATTYS.

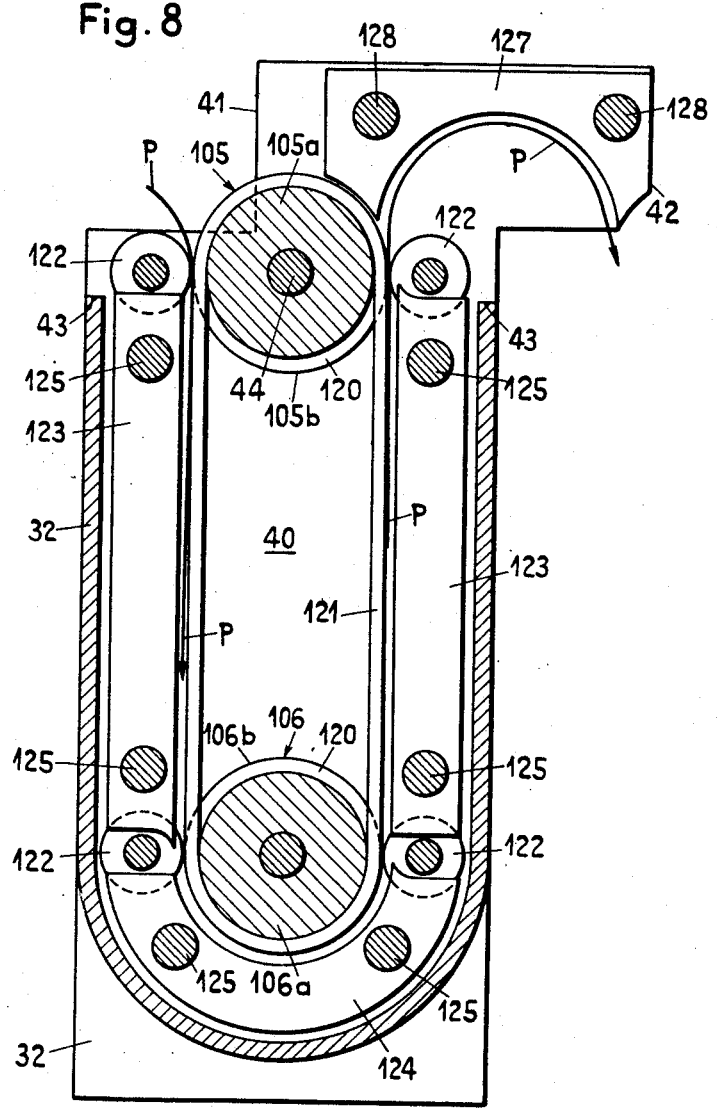

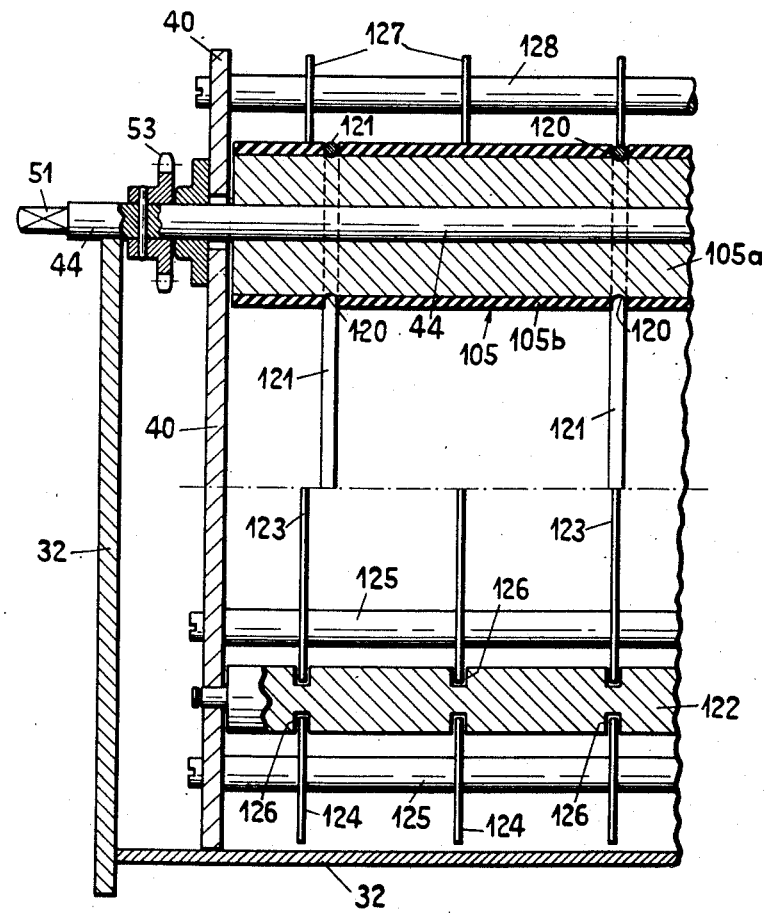

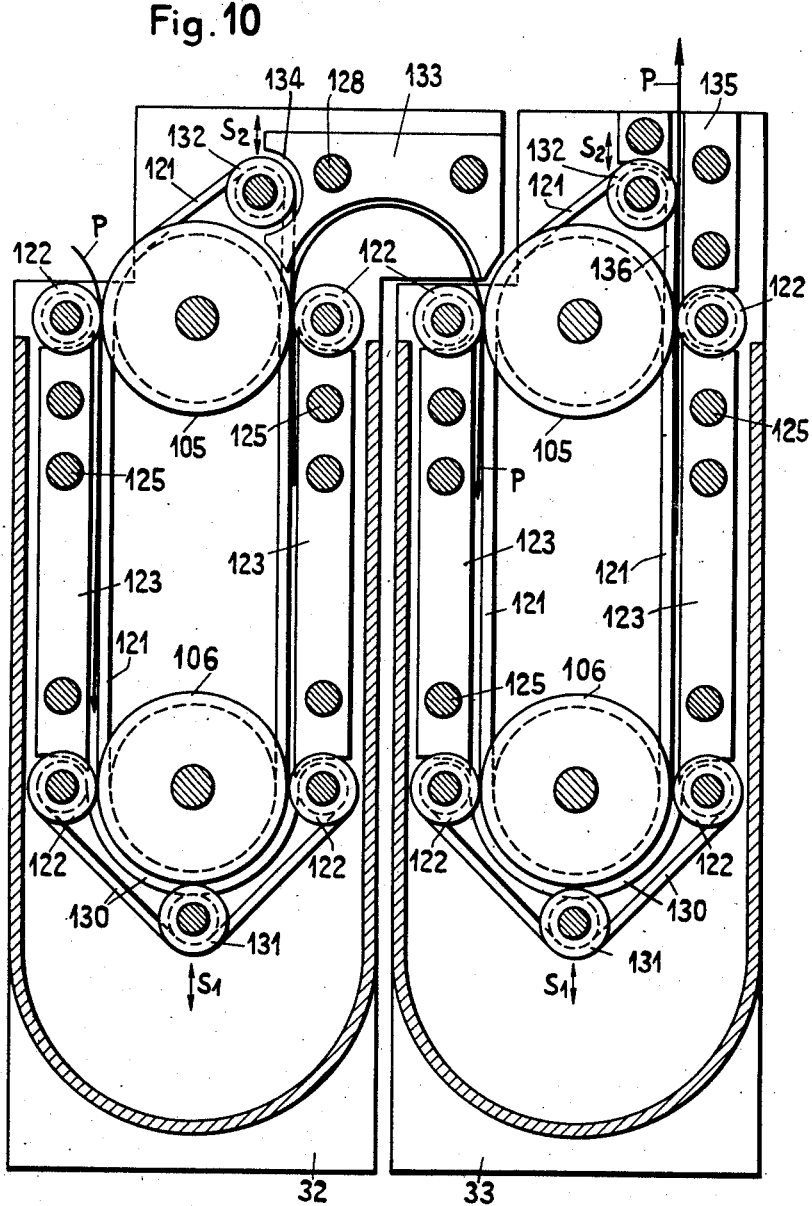

March 8, 1960  W. ZOLLINGER  2,927,503
PHOTOGRAPHIC PROJECTION COPYING DEVICE
Filed April 6, 1955  9 Sheets-Sheet 7

INVENTOR
WALTER ZOLLINGER
BY Young, Emery & Thompson
ATTYS

March 8, 1960 W. ZOLLINGER 2,927,503
PHOTOGRAPHIC PROJECTION COPYING DEVICE
Filed April 6, 1955 9 Sheets-Sheet 8
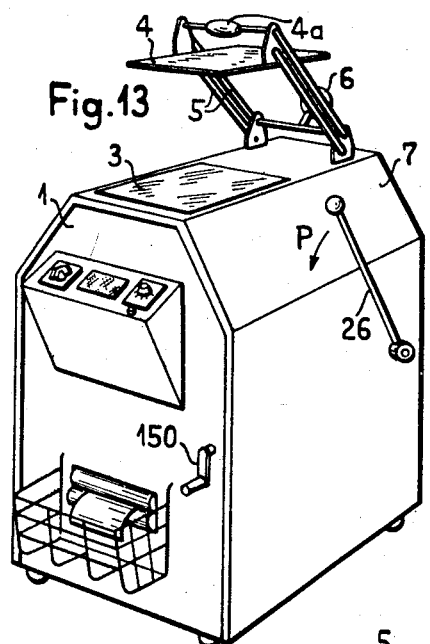
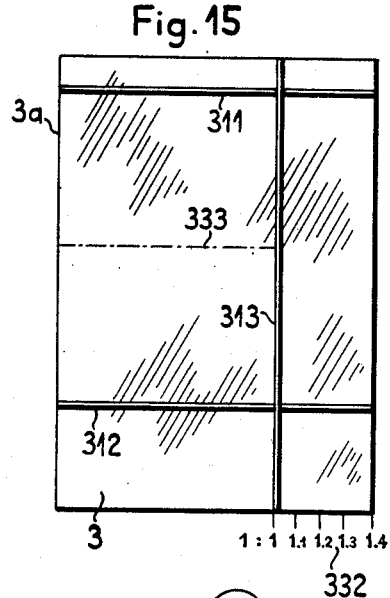
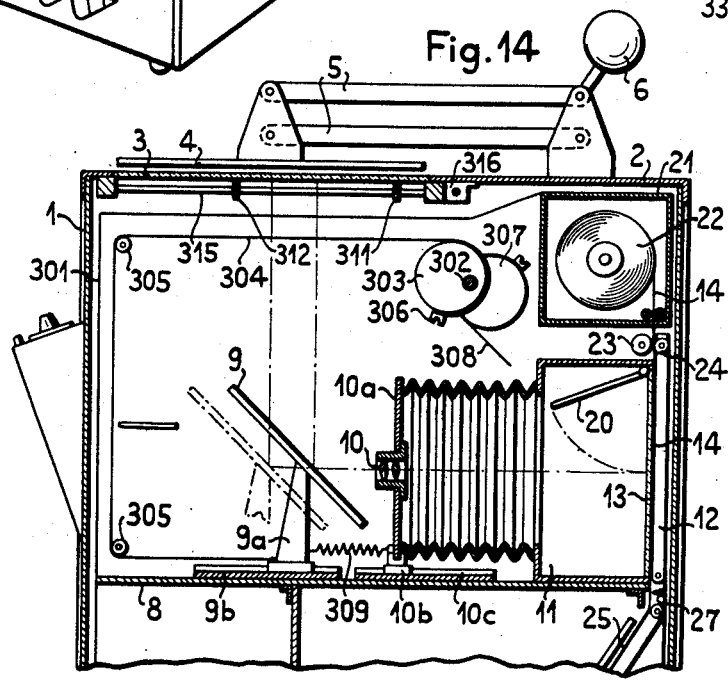
INVENTOR
WALTER ZOLLINGER
By Young, Emery & Thompson
ATTYS.

March 8, 1960    W. ZOLLINGER    2,927,503
PHOTOGRAPHIC PROJECTION COPYING DEVICE
Filed April 6, 1955    9 Sheets-Sheet 9

INVENTOR
WALTER ZOLLINGER
BY Young, Emery & Thompson
ATTYS.

United States Patent Office 2,927,503
Patented Mar. 8, 1960

2,927,503

PHOTOGRAPHIC PROJECTION COPYING DEVICE

Walter Zollinger, Zurich, Switzerland

Application April 6, 1955, Serial No. 499,737

Claims priority, application Switzerland April 10, 1954

4 Claims. (Cl. 88—24)

The present invention relates to a photographic camera combined with self-acting developing apparatus, with which originals of different formats can be copied to definite sizes, and which embodies a device for cutting off predetermined lengths of the exposed paper together with a number of withdrawable troughs or receptacles containing the various baths, and feed inserts hung in these troughs and removably connected to a drive.

According to the invention, the apparatus is essentially characterized in that the transparent supporting plate for the original is fixedly arranged on the casing of the apparatus and the cutting device is coupled to an operating lever for transporting the exposed paper into the developer, that each feed insert comprises an individually and continuously driven feeding roller to transport the paper sections through the developing apparatus, together with at least one squeeze roller cooperating therewith for squeezing off the liquid adhering to the paper, and that means are provided for circulating and renewing the water for washing the paper.

Further features of the invention will appear from the claims, description and drawing, which latter represents a preferred example of embodiment of the photographic apparatus incorporating the invention.

In said drawing:

Fig. 1 is a diagrammatic representation of the apparatus showing especially its operating members;

Fig. 3 is a diagrammatic top view of the supporting plate with indication of the format markings for the original or document;

Fig. 4 is a vertical cross-section of a trough with feed insert hung in, and

Fig. 5 is a longitudinal section taken on the line V—V of Fig. 4;

Fig. 6 shows a variant of the drying device, and

Fig. 7 is a front view of a variant of a feed insert of the developing apparatus with side plate removed;

Fig. 8 represents a vertical section of a further embodiment of a feed insert, on a larger scale;

Fig. 9 is a vertical longitudinal section of a part of the feed insert according to Fig. 8;

Figs. 10 and 11 are vertical cross-sections of further modified forms of the feed inserts.

Fig. 13 is a diagrammatic representation of an apparatus as modified with respect to Fig. 1, with its actuating members operable from outside;

Fig. 14 shows semi-diagrammatically and on a larger scale a vertical section of the top part of the apparatus;

Fig. 15 is a top view of the supporting plate for the matter to be photographed;

Figure 2:
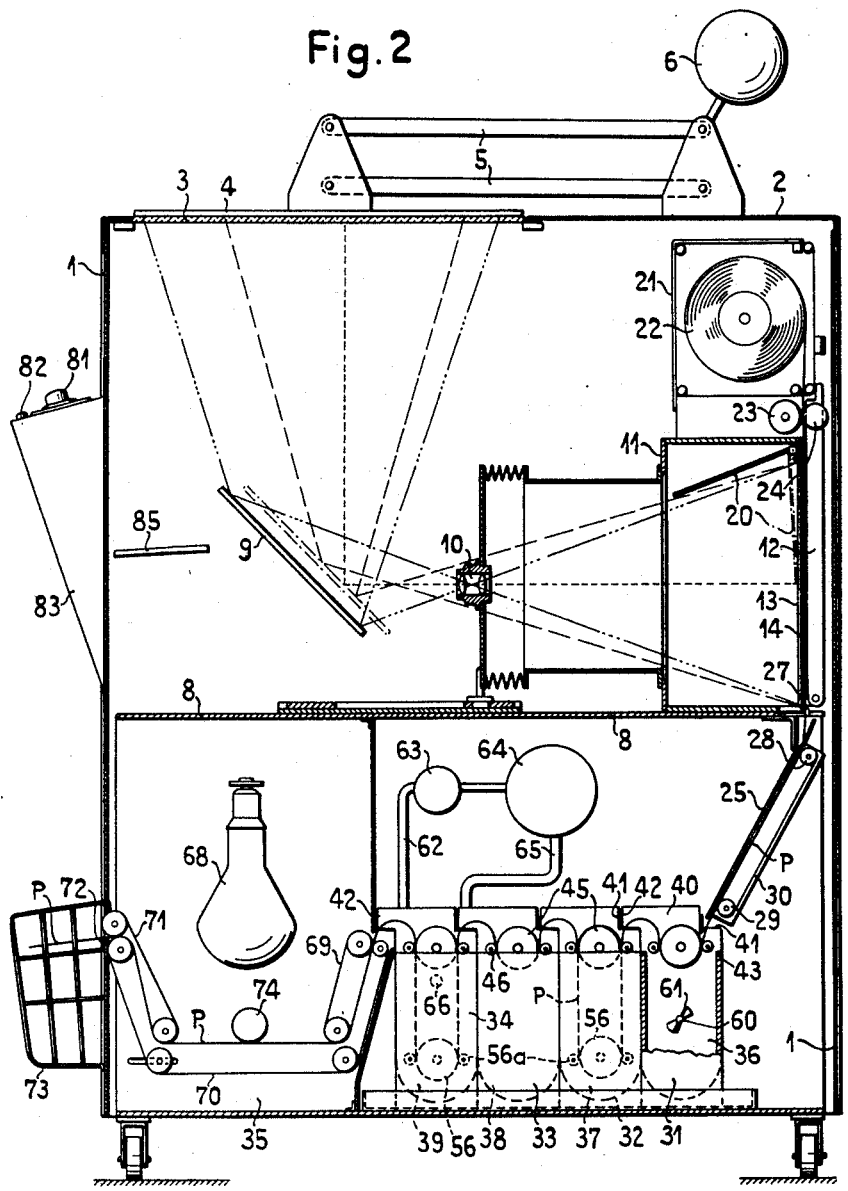
Fig. 2 is a diagrammatic vertical section of the apparatus.

The apparatus, assembled to form a closed, portable unit, comprises a casing 1 divided inside into two compartments, the upper of which accommodates essentially the photographing devices, and the lower the arrangements for developing and treating the exposed papers.

Let into the fore-part of the upper horizontal closing wall 2 of the casing 1 is a glass plate 3 for supporting the original to be photographed. A press-on plate 4 fitted with handle 4a is by means of a parallel guide 5 movably supported on cabinet 1 so that it can be pressed down onto the matter laid on, in order to keep it flat. The parallel guide 5 is furnished with a balance weight 6.

On the two long sides of the supporting plate 3, beside the edges thereof, the cabinet 1 is sloped obliquely. This facilitates the laying on of an open book, in that the page of the book to be copied comes to lie on the glass 3 and the other for instance on the oblique plate 7 of the cabinet, whereby the book must be opened less than 180 degrees.

Located in the top part of the cabinet, on both sides of the glass plate 3 is a usual illuminating device, preferably in the form of tubes.

Movably supported on a horizontal partition 8 is a mirror 9 reflecting the light rays coming from the illuminated matter, throwing them through the objective 10 into a camera 11 or onto the photographic paper 14 (Fig. 2) guided between a hinged back wall 12 and a glass plate 13.

For changing the copying scale in order to adjust the given format of a definite matter to a desired copying format, said mirror 9 may be displaced horizontally to vary the optical distance between the supporting plate 3 fast on cabinet 1 and the copying plane (14). For focusing, also the objective 10 is horizontally displaceable. The mirror 9 and the objective 10 are, in common, mechanically coupled to an operating lever 15 (Fig. 1) projecting out from the cabinet in such a way that, by swinging said lever, they can be horizontally moved towards and away from each other. Thus not only the distance between mirror and objective, but especially that between objective and copying plane will be changed so that the matter can be photographed, enlarged or reduced within given limits as desired.

The operating lever can be swung steplessly, marks 17 being made at the cabinet slot 16 through which it projects, and adapted to indicate each time the copying scale corresponding to the swung position. Moreover, according to Fig. 3, the edges of the supporting plate 3 have markings 18 thereon corresponding to the sizes A3, A4, A5 of paper in such a way that one longitudinal edge 19 of the plate 3 can be used as common limit for all formats. To compensate each time for lateral displacement of the centre of the object or document in consequence of this common marginal limit 19, the guide for horizontally displacing the objective 10 runs obliquely to the vertical plane through its optical axis, so that in all formats the middle of the object will be automatically copied onto the middle of the camera print.

Pivotally supported in camera 11 is a masking plate 20 which, in order to save paper in the case of small-sized copies, can be swivelled in front of the copying plane by externally accessible means (not shown) so as to mask off the upper half. Accordingly only that part of the object will be copied which is above the separation line, marked A5 on the supporting plate (Fig. 3). To exclude faulty operations in this respect, the masking plate 20 may preferably be joined to an externally visible optical signalling system adapted to indicate the position of said masking plate.

Housed above the camera 11 within a light-tight closable casing 21 is the supply roll 22 for the photographic paper 14 which is inserted through a transport roller 23 with counter-roller 24 as continuous strip into the camera 11 and therethrough into an inlet passage 25 located below it. An operating lever 26 arranged outside the cabinet 1, on being swung in the sense of the arrow, Fig. 1, drives the transport roller 23 via a reduction gear, while releasing, during its spring-actuated backward oscillatory movement, a spring-biassed cutting blade 27 which springs forward and cuts off from strip 14 the exposed paper section P. The next actuating of lever 26 will cause retensioning of the quick-spring of the blade 27.

The reduction gear serving to drive the transport roller 23 is moreover coupled with the mechanism of oscillation for the masking plate 20 in such a way that, with lowered plate 20, the paper strip 14 will only be advanced a distance corresponding to the reduced height of the exposed surface by operating the lever 26 in the sense of the arrow in Fig. 1.

Within the lower compartment of the cabinet, beside the developing device illustrated in Fig. 2 and separated from it by a partition, an electric motor is arranged for driving the device and may be started by operation of lever 26. The motor is joined to a time switch which stops it automatically after running for 3 minutes. But said switch may also be changed over to continuous operation.

Connected first to said motor are two rollers 28, 29 having an endless conveyor belt 30 of rubber running thereover and which carries the cut off paper sections P to the developing device through the passage 25. Said device comprises in its essence four series-arranged, withdrawable troughs 31, 32, 33, 34 containing the various baths to be passed through by the exposed paper sections P, together with a drying chamber 35 following the last baths.

Hung into said troughs are feed inserts 36, 37, 38, 39 which differ from one another according to the purpose and nature of the various baths. The general structure of the inserts, common for all troughs, is shown in Fig. 2 (cf. Figs. 4, 5 and 7–11). Each feed insert is essentially formed of two parallel plastic plates 40 braced against each other and whose tops have recesses 41 and lugs 42 with which adjacent inserts overlap each other. The inserts are hung into the troughs by means of shoulders 43. In the upper part of each insert, a transverse shaft 44 has arranged on it a feed roller 45 adapted to cooperate with each two squeeze rollers 46 for squeezing off the liquid adhering to the paper. The squeeze rollers 46 are continuously pressed onto the feed rollers 45 by springs. Bent guiding rods 47 serve to carry the paper sections P positively into the next trough and drying chamber respectively. The feed rollers 45, Fig. 5, have a covering 48 of not-too-soft rubber to offer sufficient resistance to the squeeze rollers 46. To prevent contacting of the paper sections P over their entire width and thus sticking to the feed rollers, these possess at both ends a heightened ring 49 of soft rubber which, by the squeeze rollers 46, may temporarily be compressed to the diameter of said covering 48 but will then re-expand so that the paper will be guided only at its edges and not stick to the rollers.

The shaft 44 of each feeding roller 45 terminates at one side in a squared connection 51 (Fig. 5) which, upon insertion of the respective trough into the apparatus through an opening of the partition, is put into a corresponding recess of a shaft driven by the motor. In such manner each feeding roller is individually and detachably coupled to the drive.

The plates 40 are advantageously fitted with spacer pins 52 to keep the inserts in desired lateral position in the troughs. Further rails (not shown) keep the inserts in horizontal position.

The trough 31 contains a quick-developing solution, the trough 32 a quick-fixing solution and the troughs 33 and 34 water for preliminary and splash washing of the fixed papers. Accordingly, a passage of shorter length of time through the troughs 31 and 33 and one of longer time through the troughs 32 and 34 is desirable. The paper sections 33 are merely led around the feeding roller 45, since a time of about 10 sec. through these baths is sufficient. On the other hand, the inserts 37 and 39 (Figs. 4, 5) comprise a further roller 56 journaled in the bottom part of said plates, rotatably connected through chain drive 53, 54, 55 to the feeding roller 45 and cooperative with each two guide and pressure rollers 56a, said roller 56 being of the same design as roller 45 and around which the papers are led in order to pass through for a longer time. For guiding the noncontinuous paper sections P around the roller 56, bent guide bars 57 are provided. Arranged between the rollers are each two grids 58, 59 of acidproof metallic bars between which the paper sections P are guided. Thereby the inner bars 59 located on the emulsion-bearing side of the paper are bent zigzag as in Fig. 5 to prevent the formation of scratches on the layer of emulsion. The same purpose is also served by straight bars running obliquely.

Circulation of the liquid, at least in individual troughs, may be caused by a shaft 60 (Fig. 2) rotatably connected through chain drive to the feeding roller, said shaft 60 having a number of screw blades 61 mounted thereon.

In order to renew the water the insert 39 is, through a conduit 62 and the motor-driven circulation pump 63, connected to a ion exchanger 64 disposed over the troughs and underneath the partition 8. The return pipe 65 opens direct into a spray tube 66 arranged on the feeding roller 39 and having a large number of small orifices 67 (Figs. 4 and 5) which are directed towards the paper P carried past at the left and right beside the tube 66 so that the renewed water will always be sprayed direct onto the emulsion-bearing face of the paper.

The parts of the troughs consist of acidproof and rustless material, for instance such as has become known under the trade name "Vinidur."

In the drying chamber 35, heated by an infrared lamp 68, three conveyor belts 68, 70, 71 run over the motor-connected rollers in such a way that the paper sections P carried by the conveyor belts are guided slowly past said lamp 68 over as great a distance as possible (Fig. 2). By the last conveyor belt the finished developed and dried photographs are brought out of the cabinet through a slot 72 and collected in a wire basket 73 removably arranged thereunder. In known manner provision is made for a motor-driven fan (not shown) for the drying chamber. Furthermore, for quicker drying also a felt roller 74 may be provided contacting the paper P under slight pressure.

The switch 80 (Fig. 1) for the motor, an exposure meter 81, a press-button 82 for releasing the shutter, as well as a safety device against double exposure, complete the equipment of the apparatus. These members are assembled in a structure 83 in front of the cabinet, having an inspection window 84 therein through which to check the position of the image of the original (or matter) in relation to the markings 18—through the supporting plate 3 by means of a mirror 95—prior to taking the photograph.

The apparatus is worked as follows:

Turning the switch 80 puts at first the illumination on, and further turning will cause the motor to be continuously inserted for series operation. With raised pressure plate 5 the original is laid onto the glass 3 and while observing the corresponding marks 18, checked in its proper position through the inspection window 83, whereupon said pressure plate is lowered thereon. The required time of exposure is set by means of the meter 81 and the desired copying ratio is adjusted by the lever 15.

Now exposure can take place by actuation of the pushbutton 82 and when the exposure meter has run down, the operating lever 26 is swung downwards (direction of the arrow). Incidentally the exposed paper strip will be fed into the inlet passage 25, cut off by the blade 27 and simultaneously—with individual operation—the motor and with it the infrared lamp 68 will be switched-on. The motor runs for about 3 minutes and will then be stopped by the time switch. The exposed paper sections are introduced by the conveyor belt 30 into the feed insert 36 of the first trough 31 and will traverse the developing and drying devices as described hereinbefore. After a few minutes they will be dry and ejected out of the slot 72 into the basket 73.

For changing the baths, for checking the driving sets and setting the time switch of the motor, etc., the appropriate covers and wall plates may easily be removed from the cabinet 1.

Obviously, the invention is not restricted to the aforedescribed form of embodiment as other variants might conceivably be devised by those skilled in the art. Thus, preferably, another dryer might be provided than that illustrated in Fig. 6 and be placed for instance in the drying chamber 35.

The paper coming from the developer, i.e. from trough 39, passes through the pair of squeeze rollers 90, 91 into the range of a baffle 92 which introduces the paper between a conveyor belt 94 and a drying drum 95, resting against a driving roller 93 and a guide roller 96. Said conveyor belt is taken partly around the drying drum 95, over guide rollers 97, 98, 99 and a tensioner 100. Arranged within the drying drum 95 is a heater 101 together with a thermostat 102 through which the drying temperature of the drum 95 is adjusted automatically. The dried paper 103 leaves the drum 95 at location 104 for its ejection.

Further variants relate to the feed inserts in the troughs of the developing device. A first variant is shown in Fig. 7. By its adoption the raised soft rubber edges 49 of the rollers 45 and 46 may be avoided. The rollers 105, 106 (Fig. 7) which correspond to the rollers 45, 56 (Fig. 4) are smooth at the ends. Distributed over their width, they are surrounded by a number of, say, three endless rubber cords 107 guided in grooves of the rollers. Beside the feed roller 105 there is a squeeze roller 109, and beside it as well as below the lower roller 106 provision is made for rollers 110, 111 and 112 having likewise three endless rubber cords 113 distributed over their width and guided in appropriate grooves. On their transport path the paper sections 114 come to lie between the rubber cords 107 and 113 which are spaced some millimeters apart.

A similar structure illustrates the further variants of the feed inserts according to Figs. 8–12. Also in this case the upper feed rollers 105 have each a lower feed roller 106 connected theerto by chain drive (of which the upper sprocket 53 is still visible in Fig. 9). The feed rollers 105 and 106 possess respectively a roller core 105a and 106a of acidproof material, surrounded by a rubber covering 105b and 106b respectively. Also in all these variants the feeding rollers 105 and 106 have for instance three annular grooves 120 engaged by the cords 121 which run parallel to each other and partly surround the upper and lower feeding rollers. Said cords 121 consist of some acidproof material, say, plastics known under the trade name "Grilon." They may be elastic and have a diameter of, say, 4 mm.

Each feeding rollers 105 and 106 respectively may have associated therewith two pressure or counterrollers 122 supported at the same level which may at the same time be designed as squeeze rollers for squeezing off the liquid adhering to the exposed papers and be constantly slightly pressed against the feeding rollers. Said pressure rollers 122 have for their duty to seize the paper sections P between themselves and the feeding rollers and to carry them on by adhesive friction. In order to guide the paper on both sides and to prevent sagging, special guide members are provided.

In the example according to Figs. 8 and 9, said guide members include parallel, partly straight, partly bent or obliquely positioned guide bars 123 and 124 enclosing the paper track between the counterpressure rollers externally at a distance away of a few millimeters, and being fastened to crossbars 125 which tie the plates. At both their ends said bars 123 and 124 engage correspondingly recessed grooves 126 in the counter-rollers to guide the paper sections over as long a distance as possible.

For causing the papers P to change the direction to properly transfer them into the next feed insert or into the drying chamber or the like, at top provision is made moreover for a row of parallel guiding lamellae 127 mounted on crossbars 128. These consist, like the bars 123 and 124, of some acidproof, non-rusting material.

The example according to Fig. 10 differs from that described in that for guiding the paper sections P around the lower feeding roller 106 there are no bent guide bars, but also a number of elastic cords 130 guided in parallel annular grooves of both counter-rollers 122 together with a tension roller 131 in such a way that they rest under tension direct against the feeding roller 106 and being through this driven in common. There may be provided, say, four of such cords 130 which are preferably displaced with respect to the cords 121. The papers P, sliding along the guide bars 123, arrive between the cords 121 and 130, are taken round the feeding rollers 106 and carried on the path formed by the cords 121 and the second group of bars 123. The tension rollers 121 can, by preference, be set and fixed radially in relation to the rollers 106 in order to be able at any time to adjust the tension of the cords 130 to the optimum (arrow $S_1$).

In this example of embodiment the cords 121 run likewise over a tension roller 132 supported vertically adjustable over the feeding roller 105 in order to be able to readjust also these cords (arrow $S_2$). The guiding lamellae 133 possess an appropriate recess 134. In the last feeding insert passed through, the lamellae 135 are preferably of such design that the papers will no longer be guided round, but are brought out at the top through a passage 136 by utilizing the movement of the cords.

Figure 11:
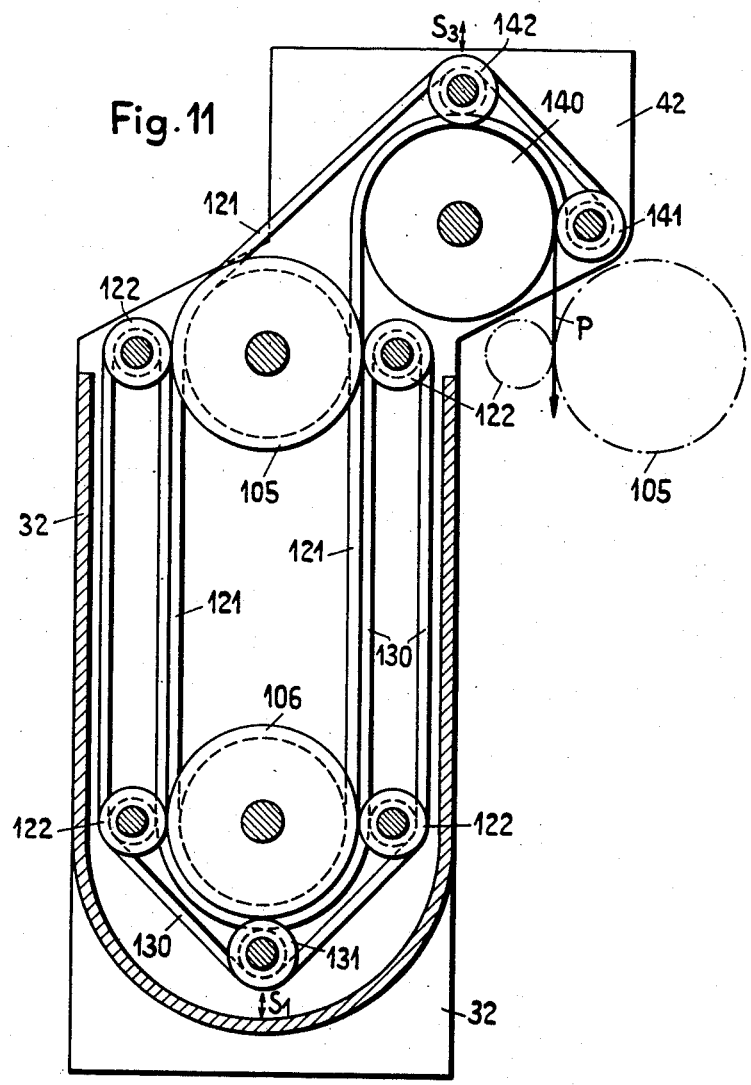

The feed insert according to Fig. 11 includes, in contradistinction to those hitherto disclosed, a further feeding roler 140 which is likewise rotatably connected to the roller 105 through chain-drive and designed as those, except for the grooves 120. The cords 121 are kept somewhat longer and partly surround also the roller 140, however so that the papers P passing through the feed inserts will be held between the cords and roller 140, taken round the roller and, after passing one of the associated counter-rollers 141, introduced into the next trough, as diagrammatically shown in Fig. 11. For re-adjustment of the cords 121, also in this case a tension roller 121 mounted for vertical adjustment is provided (arrow $S_3$) over which the cords 121 will be guided.

In contrast to the example according to Fig. 10, the guide bars 123 are in this case replaced by a lengthened extension of the cords 130 which are led round the counter-roller 122 of the upper feed roller 105 and will thus guide the papers P along their entire path in the trough 32, together with the cords 121. This embodiment has therefore the advantage that no special bars or lamellae are required for guiding the papers, the cords 121 and 130 and the roller 140 taking over the part of guiding and bend members.

The recesses and lugs 42 of the plates 40 may consequently be cut out so as to permit of more convenient joining of the various troughs and feed inserts.

Figure 12:
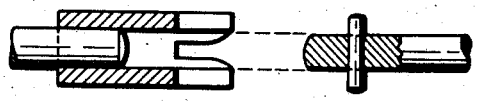
Fig. 12 shows a detail.
Figure 16:
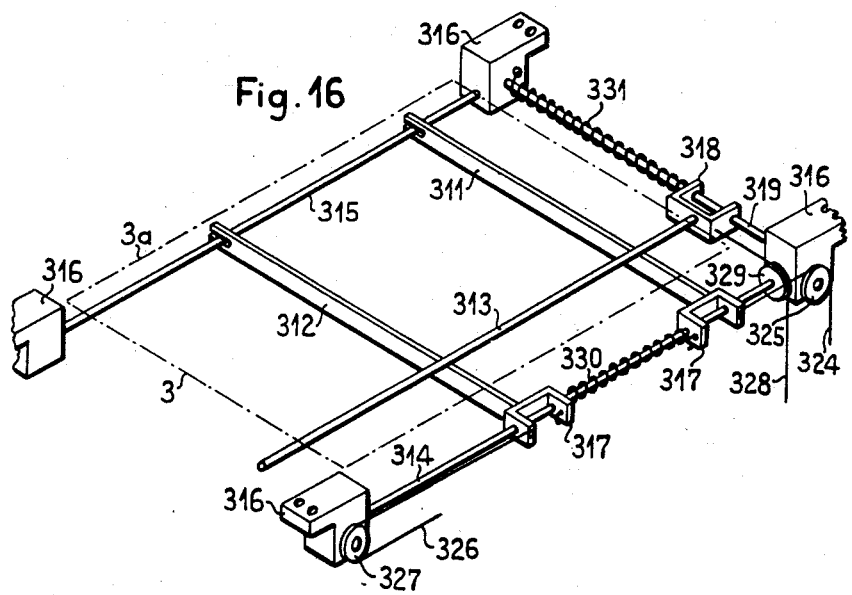
Fig. 16 is a perspective representation of a device for marking the limits of the format of the original (or matter), attached underneath the supporting plate indicated in chain-dotted lines in Fig. 4.
Figure 17:
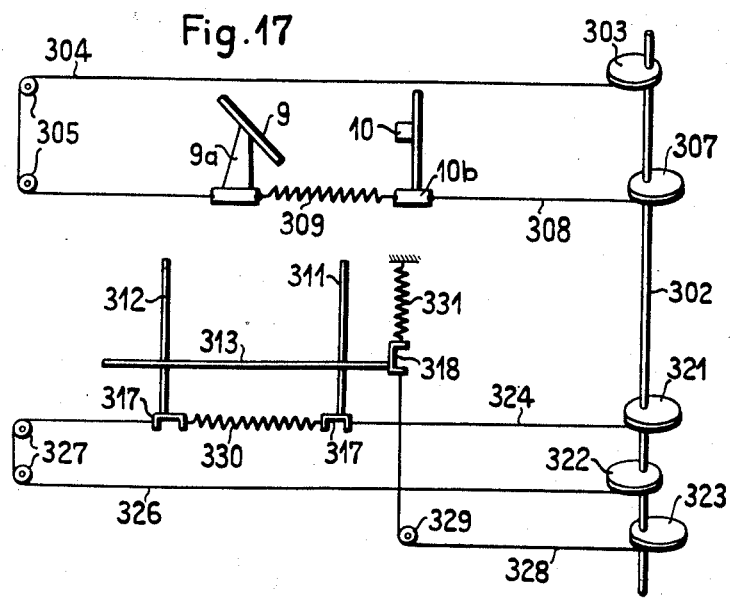
Fig. 17 shows purely diagrammatically, how the elements for format limitation, a movable mirror for changing the copying scale and the objective adjustable for focusing are positively coupled to one another.

Alternatively, instead of by a squared extension 51 (Fig. 9), the shaft of roller 105 could be detachably coupled to a driving shaft of a claw coupling as in Fig. 12 or some other suitable coupling.

Finally, the described apparatus may also be designed exclusively as an automatic machine in that it can be put automatically into operation by inserting a coin. In this event the apparatus will be arranged for only one size of image.

The described apparatus permits of developing and processing the exposed papers in an extremely short time (a few minutes), which offers an advantage over hitherto known apparatuses of the type, in that especially full utilization can be made of the properties of that now known photographic paper which already contains part of the developing substances in its layer of emulsion.

In order that also the further developing processes may keep pace with the thus possible short action-time of the developing solution, squeezing off the liquid by means of rollers prior to each entry of the papers into a further bath is necessary; this again will be rendered possible in that the transporting device for the paper sections includes no conveying members such as belts, cords, etc. accompanying them through all baths and consequently carry off liquids continually into the following baths, making these unusable very quickly. In contradistinction thereto, the transport takes place exclusively by feeding rollers 45, individually driven for each trough.

This has the further advantage that the severing of the paper sections by means of the knife 27 need not be tuned to the momentary position of the transporting member, but may take place at any time. Similarly the feeding rollers, upon re-insertion of the feed inserts after a change of bath, need not be tuned to the other transporting members.

Owing to constant renewal of the wash water by means of the ion exchanger, heating up of the hitherto constantly newly supplied fresh water is rendered superfluous, thus offering the advantage that the apparatus is ready for operation immediately after the illumination and the motor have been switched-on.

Inasmuch as thereby also the piping for the supply and removal of water is dispensed with, the whole apparatus may be designed as a mobile, closed unit without permanent installation-connections, but merely requiring an ordinary electric connection (cable K) with normal plug.

Due to the arrangement of a preliminary watering, not only will a better and quicker washing in the splash-water trough be accomplished, but also a more economical operation. The arrangement of the squeeze rollers acts in the same direction.

Finally, other merits of the aforedescribed apparatus are seen in that the supporting surface is for all copying ratios at the same level of the apparatus, that the original (or object) can by means of marks 18 be conveniently and accurately placed and be checked as to its location through the inspection window 84.

Figs. 13–17 show a form of embodiment of the apparatus, wherein for marking the limits of the format of the original momentarily adjusted, provision is made for movable elements capable of being re-adjusted automatically upon change of the copying scale.

In Figs. 13 and 14 the same reference numerals are in part to be found as in Figs. 1 and 2, insofar as the members are identical and present in both forms of embodiment.

The mirror 9 is mounted on a support 9a which can slide in a horizontal guideway 9b. The forward camera wall 10a carrying the objective 10 is mounted on a shoe 10b which can slide in a horizontal guideway 10c.

In order that with each copying scale set, one edge of the format of the original coincides with one edge 19 of the supporting plate 3 (Fig. 15) the guideway 10c extends longitudinally obliquely to the optical axis of the objective 10, so that the middle of the format of the original, at each copying scale set, will be copied onto the middle of the camera plate or print.

Journaled in the plate 301 of the apparatus is an axle 302 which (in a manner not shown) is operatively connected to a hand-crank 150 rotatably supported on the cabinet 1 and operable from outside for rotational adjustment of said axle in one sense or the other. Alternatively, instead of the crank 150 another actuating member, say, the swing lever 15 as in Fig. 1, may be coupled to the shaft 302. The latter has mounted thereon a cam disk 303 which, by means of a pliable draw-member, for instance a wire rope 304, is operatively connected to the support 9a of the mirror 9. The draw-member 304 runs over bend rollers 305 and partly over the periphery of the cam disk 303. One end of the draw-member 304 engages the support 9a, and the other end is fixed by a screw to the cam disk 303. A second cam disk 307 (or eccentric) rigidly mounted on axle 302, is in a similar way connected to the slide shoe 10b of the objective 10 by means of a pliable draw-member 308. In Fig. 14 this draw-member is only partly indicated for the sake of clarity, but is entirely visible in the diagrammatic representation of Fig. 5. Attached respectively to the slide shoe 10b and the support 9a are the two extremities of a tension spring 309 which tends to displace said shoe and support in such a way that the draw-members 304 and 308 will be tensioned. The two cam disks 303 and 307 are so shaped and arranged in relation to each other that, upon re-adjustment of the actuating member 15, they positively move the mirror 9 and objective 10 relatively to each other in a predetermined functional ratio, so that the copying ratio may be altered and the focussing of the objective be always effected automatically. Preferably the copying scale can be changed, for instance between 1:1 and 1:1.4.

Provided underneath the supporting glass plate 3 for the original are three bar-shaped elements 311, 312 and 313 which are visible through said plate 3 and mark together with its edge 19 the format limit of the original, i.e. they indicate what surface portion of the supporting plate 3 is shown each time in the image section of the camera 11. Two bars 311 and 312 extend parallel to each other and at right angles to the edge 19 of the supporting plate 3, while the third bar 313 runs parallel to said edge 19. The two bars 311 and 312 are guided on two rails 314 and 315 which, by means of holding pieces 316, are secured to the underside of the horizontal closing wall 2 of the cabinet 1. One end of the bars 311 and 312 is joined to a stirrup-shaped guide member 317, the two arms of which are guided on the rail 314 so that the bars 311 and 312 are positively kept parallel to each other.

Rigid with the axle 302 are further three cam disks (or eccentrics) 321, 322 and 323. The cam disk 321 is by means of a pliable draw-member 323, say a wire rope, coupled to the guide stirrup 317 of one bar 311. Thereby the draw-member 324 runs over a part of the periphery of the cam disk 321, being attached to this at one end and to the guide stirrup 315 at the other. The draw-member 324 runs over some rope pulleys of which only one, designated 325, is visible in Fig. 16. In quite a similar way the cam disk 322 is by means of a pliable draw-member 326 operatively connected to the guide stirrup 317 of the bar 312, said draw-member 326 running over several rope pulley 327. Through a pliable draw-member 328 running over at least one guide roller 329, the cam disk 323 is coupled to the guide stirrup 318 of the third bar 313. Interposed between the two guide stirrups 317 of the bars 311 and 312 is a tension spring 330 engaging with its ends the guide stirrups 317 and surrounding the rail 314. Said spring 330 keeps both draw-members 324 and 326 taut and tends to move the two bars 311 and 312 towards each other. A further tension spring 313 engages at one end the guide stirrup 318 of the third bar 313 and at the other end the holding piece 316. This spring 331 surrounds the bar 319 and keeps the draw-member 328 taut.

The cam disks 321, 322 and 323 are so designed and disposed with respect to each other that, upon re-adjustment of the copying ratio, the corresponding format limit of the original will each time be automatically indicated by the bars 311, 312 and 313. The bars 311, 312 and 313 serving to define the format are, together with the mirror 9 and objective 10, positively coupled to the sole operating member 150 for altering the coplying ratio.

If for instance the copying ratio is set at 1:1, said bars 311, 312 and 313 will occupy the position shown in Fig. 15 in relation to each other and to the glass plate 3. If for instance the adjusted copying ratio is 1:1.4, said bars 311, 312 and 313 are shifted outwards to the edges of the supporting plate 3 so that the size of the latter will coincide with the format of the original. According to Fig. 15 the bar 313 is also associated with a stationary scale arranged at the lower edge of plate 3 and permitting the momentary setting of the coplying scale to be read.

With the copying scale set at 1:1 and the masking plate 20—also provided in this example of embodiment—swiveled in front of the copying plane, only that part of the surface of the supporting plate 3 will be imaged photographically which in Fig. 15 is above the chain-dotted line 333 and is bounded by that line, the bars 311 and 313 and the edge 19 of the supporting plate 3.

What I claim is:

1. A photographic copying device comprising a casing, a stationary transparent supporting plate on the casing for originals to be copied and arranged horizontally, a stationary guide for a light sensitive material, the planes of said supporting plate and said light sensitive material being substantially at right angle with respect to each other, a deflecting mirror arranged in the casing to deflect light from said supporting plate to said light sensitive material, an adjustable objective to focus an image of an original placed on said supporting plate onto said light sensitive material, said mirror being displaceable to vary the optical distance between said supporting plate and said image plane to change the copying scale of said image with respect to the original, and said objective being displaceable with respect to said mirror to enable focussing of said image for any position of said mirror, a single externally accessible operating member on the outside of the casing positively coupled to said mirror and said means for focussing the objective, and elements for indicating the format limits movably arranged below said transparent supporting plate and in the casing, said operating member being positively coupled to said elements to move them automatically as the position of the mirror and thereby the copying scale is changed.

2. A photographic copying device according to claim 1, in which said operating member is coupled to a rotary axle carrying a plurality of cam discs each one of which is operatively connected to one of said elements for indicating the format limits to said mirror and to said means for focussing the objective, respectively, by means of a flexible draw-member attached to and wound on the corresponding cam disc, said elements, mirror and means for focussing the objective being under the influence of spring means which tend to displace said elements, mirror and means for focussing the objective so that said draw-members are tensioned.

3. A photographic copying device according to claim 1, in which said elements for indicating the format limits comprises three bars, two of which are guided parallel to each other and the third at right angles to the first two bars, the fourth edge of the format of the original being all the time indicated by an edge of said supporting plate extending parallel to said third bar.

4. A photographic copying device according to claim 1, in which said supporting plate is provided with a stationary scale, a portion of one of said elements for indicating the format limits serving as a pointer cooperating with said scale, said element and scale permitting the momentary adjusted copying scale to be read.

References Cited in the file of this patent

UNITED STATES PATENTS

| | | |
|---|---|---|
| 810,388 | Beidler | Jan. 23, 1906 |
| 1,365,184 | Muller | Jan. 11, 1921 |
| 1,974,353 | Zollinger | Sept. 18, 1934 |
| 2,031,071 | Roehrl | Feb. 18, 1936 |
| 2,137,028 | Raw | Nov. 15, 1938 |
| 2,141,176 | Draeger | Dec. 27, 1938 |
| 2,388,837 | Dye | Nov. 13, 1945 |
| 2,415,424 | Gaebel | Feb. 11, 1947 |
| 2,437,898 | Swanson | Mar. 16, 1948 |
| 2,552,251 | Bornemann | May 8, 1951 |
| 2,580,720 | Bass | Jan. 1, 1952 |
| 2,582,001 | Bornemann | Jan. 8, 1952 |
| 2,664,038 | Canham | Dec. 29, 1953 |
| 2,705,970 | Caps | Apr. 12, 1955 |